Oct. 26, 1926.  
R. M. WERNER  
1,604,139  
AUTOMOTIVE UNIT MOUNTING  
Filed Sept. 29, 1924    2 Sheets-Sheet 1

INVENTOR  
Ralph M. Werner  
BY  
George Ramsey  
His ATTORNEY

Oct. 26, 1926.

R. M. WERNER 1,604,139

AUTOMOTIVE UNIT MOUNTING

Filed Sept. 29, 1924    2 Sheets-Sheet 2

INVENTOR
Ralph M. Werner
BY
George Ramsey
his ATTORNEY

Patented Oct. 26, 1926.

1,604,139

UNITED STATES PATENT OFFICE.

RALPH M. WERNER, OF BROOKLYN, NEW YORK.

AUTOMOTIVE UNIT MOUNTING.

Application filed September 29, 1924. Serial No. 740,457.

The present invention relates broadly to automotive constructions and more especially to the mounting of the units or parts on the chassis frame.

Heretofore in the art, it has been customary to mount the body, the engine, or the transmission solidly and rigidly on the chassis frames. For example, the engine trunnions were bolted rigidly to the sides of the chassis frame and the front end of the engine frame was secured rigidly to a cross-bar or front sill. The transmission was secured in a similar manner, and the body was simply bolted to the chassis frame. The bolts for securing these parts heretofore have been located in inaccessible positions so that it was difficult to get into the vicinity of the bolt or nuts with tools for removing these bolts or units so that the units could not be taken from the frame when necessary, except by excessive labor in difficult positions. This is particularly true in connection with trucks or the like in which the heavy body of the truck extended over the part of the frame through which the bolts enter. When necessary, to move the body, engine, or transmission from the truck frame, long and laborious preliminary operations were necessary to be performed.

The present invention overcomes the difficulties of the known art by providing a construction in which the units are provided with trunnions or cross-bearings which are held by clamp spring members without the use of bolts in such manner that by tilting or manipulating the one end of the unit, the spring clamps release their bite on the trunnions so that the unit may be removed. The forward end of the engine, for example, according to the present invention, is secured in position by a collar provided with an extension bolt that passes through the front sill, and a similar construction is provided for the transmission. When this forward collar is removed, the unit may be manipulated in such manner as to free the clamp springs from the trunnions and then the unit is free to be moved forward and lifted from the chassis.

The body is provided with brackets that carry trunnions which engage spring clamps on the chassis frame, while the opposite end of the body is securely bolted to the chassis frame.

From the foregoing, it will appear that the principal object of the present invention is a unit mounting for automotive construction in which the releasing of one end of the unit from its mounting renders the unit capable of being completely freed without further use of tools.

A further and more specific object of the present invention is an automotive unit mounting in which one end of the unit frame is bolted in position on the chassis and the other end is held in position by spring tension interlocking means operative without the use of bolts.

A still further object of the present invention is an automotive unit mounting in which the swinging of the longitudinal axis of the unit into line with the axis of the chassis causes an interlocking between a portion of the unit frame and the chassis frame to hold the part in place.

A still further object of the present invention is a body, engine or transmission mounting comprising members adapted to be slid into contact with spring jaws and then to be rotated in such manner as to cause said members to pry said jaws apart, thereby causing the jaws to exercise a clamping action upon the said members to hold the parts flexibly in place.

A more specific object of the present invention is a body, engine or transmission unit mounting for trucks or the like in which the unit frame is provided with a pair of trunnion arms having squared ends with a portion of one corner of the squared ends cut away so that said ends may be shoved under a pair of spring members with the axis of the unit inclined to the axis of the chassis frame and then the axis of the unit is brought into line with the axis of the chassis frame. The squared ends are rotated to cause the springs to clamp said ends tightly between the jaws of said springs.

Another object of the present invention is a flexible three point mounting for automotive units to prevent strains in the chassis frame from being transmitted to the unit.

Other and further objects of the present invention will in part be obvious and will in part be pointed out in the specification hereinafter by reference to the accompanying drawings forming a part of this application.

It is recognized that the present invention may be embodied in constructions other than those herein specifically illustrated and therefore, it is desired that the construction disclosed herewith shall be considered as illustrative and not in the limiting sense.

Figure 1:
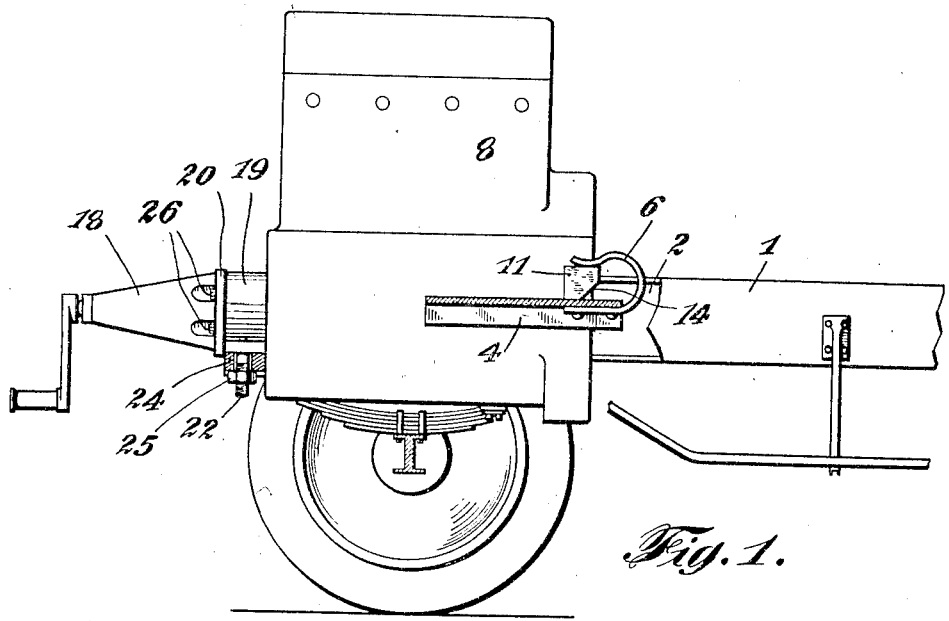
Fig. 1 is a detailed view illustrating a portion of the front of an automobile chassis with certain parts in section and showing one of the spring clamps effective to hold the engine in position.
Figure 2:
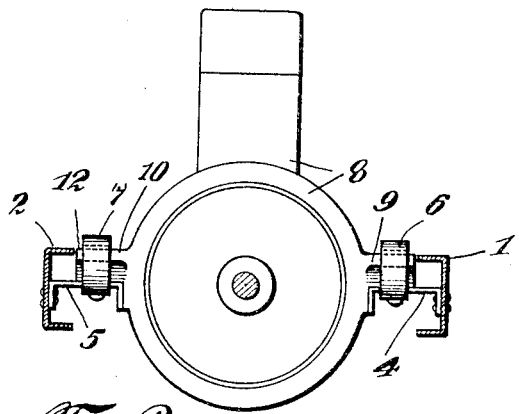
Fig. 2 is a sectional front view of the engine mounting.
Figure 4:
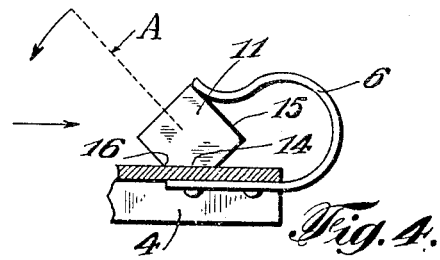
Fig. 4 illustrates one form of the end of the trunnion arm before the clamp is effective.
Figure 5:
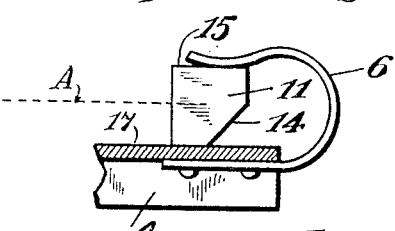
Fig. 5 is a view similar to Fig. 4, but showing the spring clamp fully effective.
Figure 3:
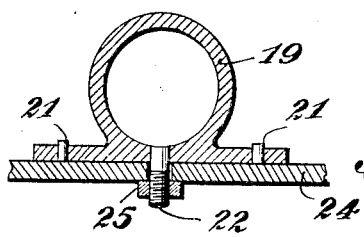
Fig. 3 is a detail view of one form of mounting for the front of the engine.

Referring now to the drawings, and more especially to Figs. 1 and 2, the side frames 1 and 2 of the chassis are provided with shelves or brackets 4 and 5 secured to the side rails. These brackets carry at their rear ends spring members 6 and 7 which are preferably securely riveted to the shelves and comprise spring clamp jaws having a clamping power of considerable capacity. The engine 8, shown diagrammatically, is provided with a pair of trunnions 9 and 10, each of which has squared ends 11 and 12. One corner of the squared ends is cut away as at 14 so that when the trunnions are shoved back against the spring members 6 and 7 with the axis of the engine inclined according to the dotted lines A in Fig. 4, the upper surface 15 contacts with the spring member at an inclined position. As the axis, as shown by dotted line A, is lowered into the position shown in Fig. 5, the corner 16 acts as a fulcrum thereby prying up the spring jaw and causing this spring member to tightly clamp the end of the trunnion between the free end of the jaw and the top 17 of the shelf 4 or 5; which acts as the other member of the jaw, and also as a support for the weight of part of the engine. It therefore will be seen that the trunnion arms of the engine are very securely clamped in position without the use of bolts. At the same time, this three point mounting provides a certain freedom of sliding movement for engine which relieves the engine frame from twists in the chassis frame. When the axis of the engine is lowered to the position of the dotted line A of Fig. 5, the crank barrel 18 of the engine is removed and the collar 19 is slipped over the main cylindrical collar on the front of the engine frame. This collar is adapted to be held in position by dowel pins 21 and the extension bolt 22 which passes through the front sill or cross-bar 24, and which bolt is provided with a suitable nut or other locking member 25 which securely holds the collar in place on the sill. The cylindrical boss 20 on the engine frame is securely locked in the collar 19 by replacing the crank barrel 18 and securing the same in place by the stub screws 26.

From the foregoing, it will be observed that the engine is mounted in such manner as to be mounted or demounted by the removal of a single bolt or nut. This is accomplished by freeing the front end of the engine by loosening this single nut or bolt 25; then by tipping the axis of the engine to decrease the effective height of the supporting trunnions beneath the interlocking members which preferably, though not necessarily, are spring members; and then sliding the engine trunnions out from under the interlocking members. This mounting has also the very great advantage of being highly flexible when the truck or automobile is in use, in that the trunnion arms are capable of yielding slightly under the spring jaws, and may slide slightly on the shelves while the front mounting for the engine frame permits a rotary movement relatively to the chassis frame.

Figure 6:
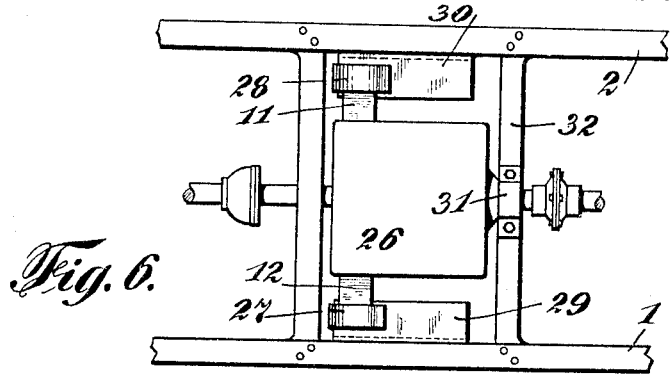
Fig. 6 is a plan view of a transmission mounting.

This same three point mounting utilizing the spring clamps is adapted to mount a transmission in place in the same manner as an engine frame, and Fig. 6 shows a transmission 26 held in place between the side frames 1 and 2 by the spring clamps 27 and 28 mounted on the shelves 29 and 30, (all of which are of the same construction as the shelves 4 and 5 and the spring jaws 6 and 7 used on the engine). The front end of the transmission 26 is held in position by the clamp collar 31 carried on the cross-bar 32. This construction permits the chassis frame to twist without twisting the transmission.

Figure 7:
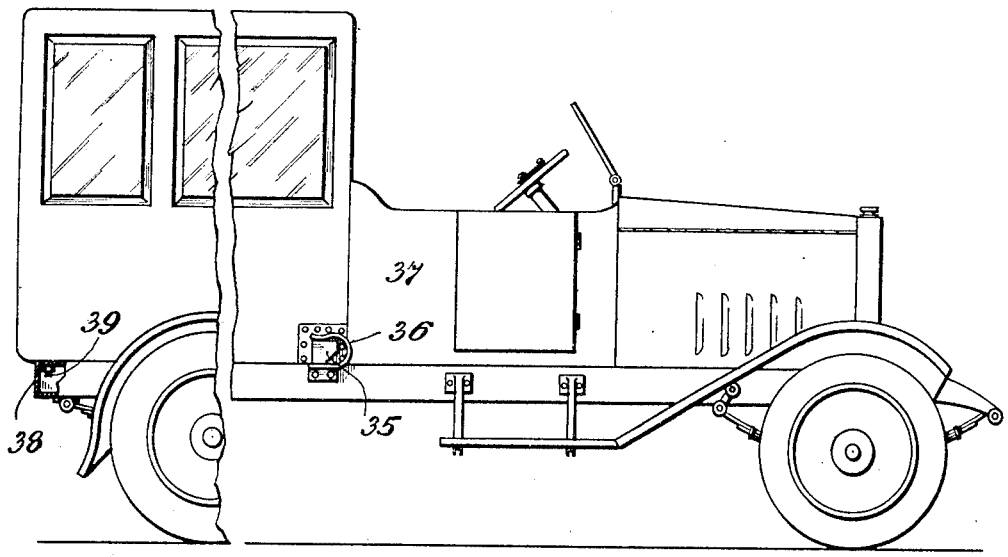
Fig. 7 illustrates the mounting for a body.

Fig. 7 is a diagrammatic and fragmentary view which shows the present invention adapted to hold a body, such as a bus body, on the chassis frame. The construction is especially useful in this connection because the distortion of the chassis frame due to uneven roadways or road shocks does not twist the body and thus does not rack the same or cause the windows to twist and bind. In Fig. 7, brackets may be secured to the sides of the body and are provided with extensions 35 (which are exactly like the squared ends 11 and 12 on the engine trunnions). These extensions 35 are adapted to cooperate with clamp springs 36 on the chassis frame and thus securely hold the front end of the body 37 in place. The rear portion of the body 37 is bolted to the end frame 3 by a king bolt 39. This construction permits the body to be quickly removed when desired and provides a flexible mounting which relieves the chassis frame and the body, each from the stresses of the other.

The present invention provides flexible units for the principal mounting of an autovehicle and permits such units to be quickly removed by minimum effort.

In connection with the present invention as applied to attaching a body to a chassis, I have illustrated a conventional body that may, however, be a detachable load carrying unit such as is in use as unit freight compartments which are adaptable to be removed for transportation on freight cars or for any other purpose or reason.

Figure 8:
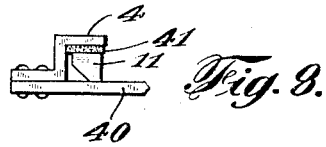
Fig. 8 is a diagrammatic view of a different type of mounting.

In Figure 8 I have shown a different form of interlocking support comprising a rigid arm 40 attached to the shelf bracket 4 with an elastic medium 41, such as rubber, between the upper part of the rigid arm 40 and the top of a trunnion 9. Obviously this type of mounting may be used on both trunnions in the place of the spring construction illustrated as the preferred form. This modified construction gives a large bearing surface over the trunnion arm and in some cases may be preferable to the spring construction hereinbefore referred to.

Figure 9:
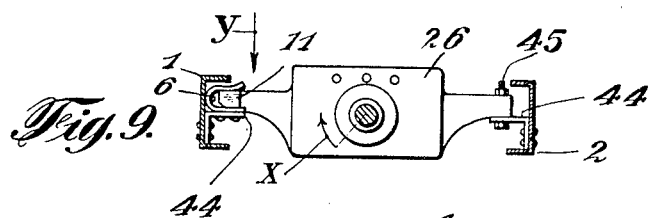
Fig. 9 is a front view of a transmission unit mounted differently from the mounting illustrated in Fig. 6.

Fig. 9 illustrates in a diagrammatic way a transmission unit 26 in which two of the three points of the mounting are upon one side rail of the chassis frame and the other point is on the opposite chassis frame rail. In this construction both spring members are on one side of the chassis frame so that the spring reaction may absorb certain rotative vibrations. In this view, Fig. 9, the parts are illustrated as looking toward the front end of the transmission casing. When viewed from the front end, the rotation of the power shaft is in a clockwise direction as indicated by the arrow X. When the transmission is operating the resistance or reaction of the transmission casing to the rotative forces is opposite to the rotation of the power shaft and the direction of the reaction of the transmission casing under such conditions is illustrated by the direction of the arrow Y. It will be noted that in this form of mounting the reactive forces represented by arrow Y are taken up by the solid bracket, whereas the spring, or elastic member, above the trunnion receives and absorbs forces of reaction in the opposite rotative direction.

The opposite side of the transmission frame in this form of mounting is supported upon the bracket 44 and may be secured thereto by any convenient securing member, for example, the bolt 45. This type of mounting of the transmission may be desirable in connection with certain constructions, in that the mounting will absorb certain rotative forces which are not absorbed in the same way in the linear or straight line mounting illustrated in Figure 6 of the drawings.

Having thus described my invention, what I claim is:—

1. In an automotive vehicle the combination of a chassis frame, a removable unit provided with rotatable connecting members, spring jaws connected to said chassis frame and adapted to be pried open by the rotation of said members and to cooperate with said connecting members to interlock one end of said unit with said chassis frame, and means for locking the other end of said unit in position.

2. In an automotive vehicle the combination of a removable unit, a chassis frame, a pair of spring jaws, a pair of trunnion members on said unit, the ends of said trunnions being provided with clamp blocks adapted to enter said spring jaws and pry the same open to cause said jaws to securely clamp upon said clamp blocks, and means to lock said unit in position with said jaws clamped upon said blocks.

3. In an automotive vehicle the combination of a removable unit, a pair of arms on said unit, a clamp block on the end of each arm, a chassis frame, a pair of spring jaws carried by said chassis frame, said clamp blocks having a fulcrum portion and an engaging portion adapted to engage the spring member of one of said jaws and to pry said jaw open when said arms are rotated with the engaging portion of the clamp block under the said spring, said blocks having a sliding portion on the under side and a sliding surface to engage said spring jaws.

4. In an automotive vehicle the combination of a removable unit, a pair of arms on said unit, a clamp block on the end of each arm, said blocks being substantially square with the forward lower corners cut away to provide flat sides, a chassis frame, a pair of shelf members carried by said chassis, spring members carried by said shelves and adapted to engage the top surfaces of said blocks when said blocks are slid beneath said springs with the blocks resting upon said flat sides, and to pry said springs open when said blocks are rotated.

5. In an automotive vehicle the combination of a removable unit, a pair of arms on said unit, a clamp block on the end of each arm, said blocks being substantially square with the forward lower corners cut away to provide flat sides, a chassis frame, a pair of shelf members carried by said chassis, U-shaped spring members carried by said shelves and adapted to engage the top surfaces of said blocks when said blocks are slid beneath said springs with the blocks resting upon said flat sides, and to pry said springs open when said blocks are rotated, said blocks having a sliding movement upon said shelves and beneath said U-shaped springs.

6. In an automotive vehicle; a chassis member; a removable unit; a pair of coaxial trunnion arms extending laterally from opposite sides of said unit, and overhanging yielding means clamping said trunnion arms against a portion of said chassis member, the ends of said trunnion arms being shaped to effect the clamping by sliding them under the overhanging yielding means and rotating the removable unit about the common axis of the two trunnion arms.

7. In an automotive vehicle; a chassis frame; a removable unit, a pair of coaxial trunnion arms extending laterally from opposite sides of said unit at one end thereof, overhanging spring means clamping said trunnion arms to hold the same in position relative to said chassis, the ends of said trunnion arms being shaped to effect the clamping by sliding them under the overhanging spring means and rotating the removable unit about the common axis of the two trunnion arms; and means to secure the end of said removable unit which is opposite the end having the trunnion arms, said means permitting limited torsional movement of said unit when the same is clamped in position.

RALPH M. WERNER.